United States Patent
Kang et al.

(10) Patent No.: US 8,421,870 B2
(45) Date of Patent: Apr. 16, 2013

(54) METHOD AND APPARATUS FOR AUTOMATIC CONTROL OF MULTIPLE CAMERAS

(75) Inventors: Hyun Kang, Daejeon (KR); Ho Won Kim, Daejeon (KR); Chang Woo Chu, Daejeon (KR); Bon Ki Koo, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 309 days.

(21) Appl. No.: 12/862,963

(22) Filed: Aug. 25, 2010

(65) Prior Publication Data

US 2011/0149093 A1 Jun. 23, 2011

(30) Foreign Application Priority Data

Dec. 18, 2009 (KR) .................. 10-2009-0127345

(51) Int. Cl.
*H04N 5/232* (2006.01)
(52) U.S. Cl.
USPC .................................. 348/211.11; 348/218.1
(58) Field of Classification Search .... 348/211.3–211.9, 348/218.1, 222.1
See application file for complete search history.

(56) References Cited

U.S. PATENT DOCUMENTS

| | | | |
|---|---|---|---|
| 5,255,096 A | 10/1993 | Boyle | |
| 6,084,979 A | 7/2000 | Kanade et al. | |
| 6,317,166 B1 | 11/2001 | McCutchen | |
| 6,597,406 B2 | 7/2003 | Gloudemans et al. | |
| 6,624,846 B1 * | 9/2003 | Lassiter | 348/211.4 |
| 8,154,599 B2 * | 4/2012 | Aoki et al. | 348/159 |
| 2005/0078184 A1 * | 4/2005 | Sakai et al. | 348/143 |
| 2006/0066723 A1 | 3/2006 | Iwase et al. | |
| 2009/0322891 A1 * | 12/2009 | Kondo et al. | 348/218.1 |
| 2010/0265331 A1 * | 10/2010 | Tanaka | 348/159 |

* cited by examiner

*Primary Examiner* — Gevell Selby
(74) *Attorney, Agent, or Firm* — Staas & Halsey LLP

(57) ABSTRACT

Disclosed are an apparatus and a method for automatic control of multiple cameras capable of supporting an effective camera view angle in a broadcast, a movie, etc. The automatic control apparatus of multiple cameras includes: a first main camera; a first camera driver controlling an operation of the first main camera; a second main camera; a second camera driver controlling an operation of the second main camera; at least one auxiliary camera; at least one third camera driver controlling an operation of the at least one auxiliary camera; and an interoperation processor changing a view angle of the at least one auxiliary camera by controlling the at least one third camera driver in accordance with a view angle changing reference changed by changing the view angle of the first main camera, the second main camera, or the first and second main cameras.

10 Claims, 5 Drawing Sheets

METHOD AND APPARATUS FOR AUTOMATIC CONTROL OF MULTIPLE CAMERAS

CROSS-REFERENCE TO RELATED APPLICATIONS

This application claims priority under 35 U.S.C. §119 to Korean Patent Application No. 10-2009-0127345, filed on Dec. 18, 2009, in the Korean Intellectual Property Office, the disclosure of which is incorporated herein by reference in its entirety.

BACKGROUND OF THE INVENTION

1. Field of the Invention

The present invention relates to an apparatus and a method for automatic control of multiple cameras for supporting an effective camera view angle in a broadcast, a movie, etc.

2. Description of the Related Art

A video view angle is a very important factor in a broadcast, a movie, etc. and there are many known techniques for the video view angle. In recent years, there have been efforts to provide more realistic videos to viewers using a plurality of cameras. For example, a video photographing technique called a bullet time used in a movie, "Matrix" is a technique producing a video through fine camera shuttering after hundreds of cameras are disposed around actors.

However, in case of using the video photographing technique such as the bullet time, when a problem occurs after the video is produced, it is difficult to rephotograph and edit the video. Further, it requires a lot of efforts and much time to install and control hundreds of cameras.

Meanwhile, in the case of the movie, since enough photographing time can be given, various view angles can be applied using a plurality of cameras. However, in the case of broadcast contents such as sport relay broadcasting, outputting and editing videos should be performed substantially in real time or with a delay time of just several minutes. Therefore, a broadcasting station that prepares for broadcast contents such as athletic events is producing real-time videos by deploying expert cameramen and the plurality of cameras together.

However, in a video photographing technique using the expert cameramen, videos photographed by each camera or a main camera depend on senses or abilities of the expert cameramen. That is, when the videos photographed by the expert cameramen show a difference in view angle, it is difficult to transfer consistent videos to the viewers. As a result, the video photographing technique requires a video control system equipped with a lot of human resources and equipments in order to control the difference in view angle of the videos.

SUMMARY OF THE INVENTION

The present invention provides an apparatus and a method for automatic control of multiple cameras capable of interoperating view angles of a plurality of cameras by automatically modifying a view angle of an auxiliary camera on the basis of variation of a view angle of a main camera.

Further, the present invention provides to a method and an apparatus for automatic control of multiple cameras capable of providing a view angle of 360 degrees for an interested object or more and being used in 3D restoration.

In addition, the present invention provides a method and an apparatus for automatic control of multiple cameras introducing a view angle model concept that does not substantially require an additional video processing or domain knowledge.

In order to achieve the above-mentioned objects, according to an aspect of the present invention, there is an apparatus for automatic control of multiple cameras that includes: a first main camera; a first camera driver controlling an operation of the first main camera; a second main camera; a second camera driver controlling an operation of the second main camera; at least one auxiliary camera; at least one third camera driver controlling an operation of the at least one auxiliary camera; and an interoperation processor changing a view angle of the at least one auxiliary camera by controlling the at least one third camera driver in accordance with a view angle changing reference changed by changing the view angle of the first main camera, the second main camera, or the first and second main cameras, wherein the view angle changing reference is formed at view angle overlapping areas of the first and second main cameras.

According to another aspect of the present invention, there is a method for automatic control of multiple cameras that includes: receiving first information that is outputted from a first camera driver in accordance with a genlock signal and includes view angle information and a timecode of a first main camera; receiving second information that is outputted from a second camera driver in accordance with the genlock signal and includes view angle information and the timecode of a second main camera; receiving third information that outputted from at least one third camera driver in accordance with the genlock signal and includes view angle information of at least one auxiliary camera and the time code; and changing the view angle of the at least one auxiliary camera to a view angle changing reference formed by a view angle overlapping area of the first and second main cameras on the basis of the view angle information of the first or second main camera within the first information or the second information.

In the embodiment, the automatic control method of multiple cameras includes capturing and collecting the video images from the first, second, and third information; and extracting the timecode from the collected video images.

DETAILED DESCRIPTION OF THE PREFERRED EMBODIMENTS

Figure 1:
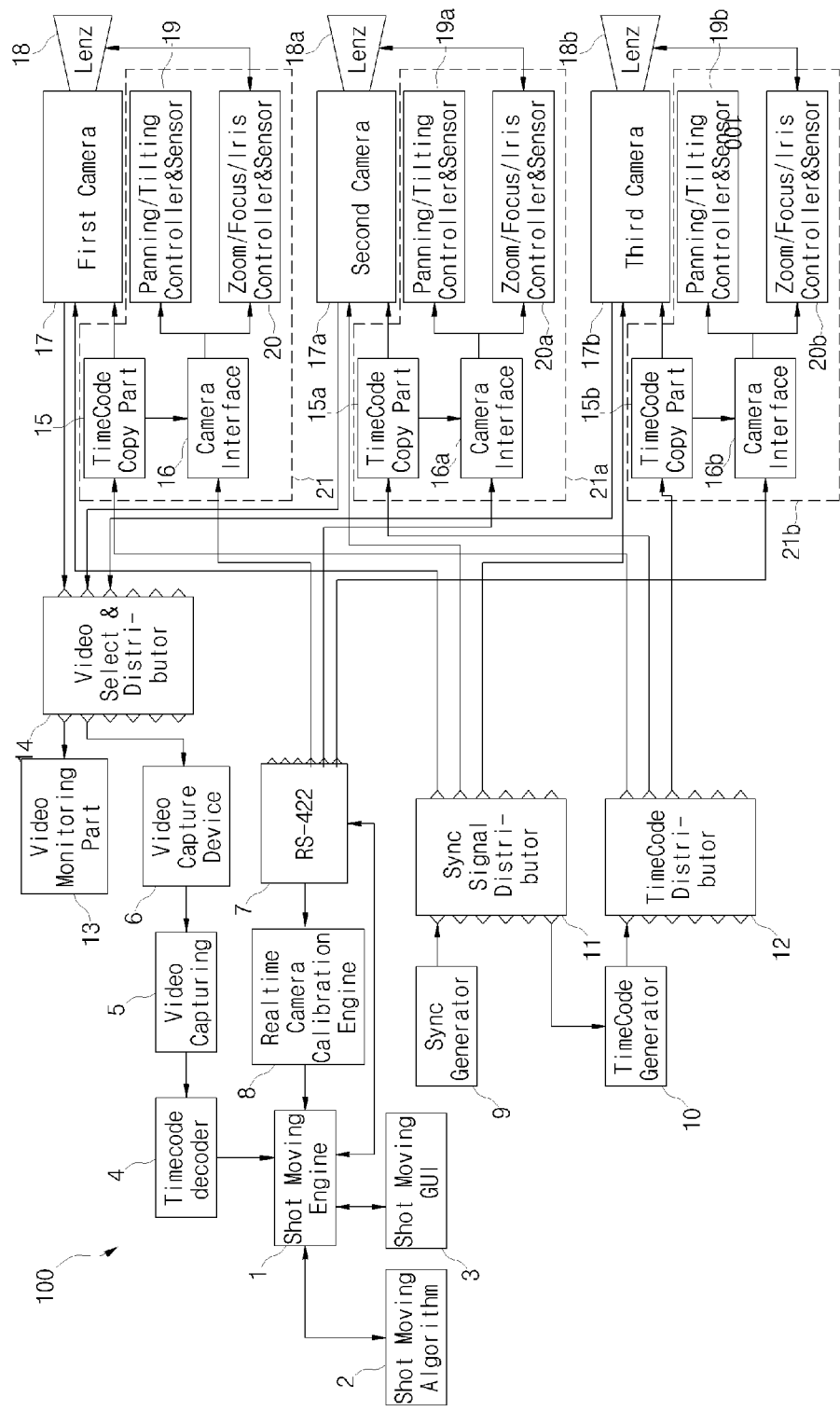
FIG. 1 is a block diagram showing a structure of an apparatus for automatic control of multiple cameras according to an exemplary embodiment of the present invention.

Hereinafter, the exemplary embodiments of the present invention will be described in detail with reference to the accompanying drawings and contents to be described below. However, the present invention is not limited to embodiments described herein and may be implemented in other forms. On the contrary, the embodiments introduced herein are provided to fully understand the disclosed contents and fully transfer the spirit of the present invention to those skilled in the art. Like elements refer to like reference numerals throughout the specification. Meanwhile, terms used in the specification are used to explain the embodiments and not to limit the present invention. In the specification, a singular type may also be used as a plural type unless stated specifically. "Comprises" and/or "comprising" used the specification mentioned constituent members, steps, operations and/or elements do not exclude the existence or addition of one or more other components, steps, operations and/or elements.

FIG. 1 is a block diagram showing a structure depending on functions of hardware and software for an apparatus for automatic control of multiple cameras according to an exemplary embodiment of the present invention.

Referring to FIG. 1, an automatic control apparatus 100 of multiple cameras includes a shot moving engine 1, a shot moving algorithm 2, a shot moving graphical user interface (GUI) 3, a timecode decoder 4, a video capturing middleware 5, a video capture device 6, a main interface 7, a realtime camera calibration engine 8, a sync generator 9, a timecode generator 10, a sync. distributor 11, a timecode distributor 12, a video monitoring part 13, a video select and distributor 14, a first camera 17, a first lens 18, a first PTZFI device 21, a second camera 17a, a second lens 18a, a second PTZFI device 21a, a third camera 17b, a third lens 18b, and a third PTZFI device 21b.

The first PTZFI device 21 includes a first timecode copy part 15, a first camera interface 16, a first panning/tilting controller and sensor 19, and a first zoom/focus/iris controller and sensor 20. The second PTZFI device 21a includes a second timecode copy part 15a, a second camera interface 16a, a second panning/tilting controller and sensor 19a, and a second zoom/focus/iris controller and sensor 20a. The third PTZFI device 21b includes a third timecode copy part 15b, a third camera interface 16b, a third panning/tilting controller and sensor 19b, and a third zoom/focus/iris controller and sensor 20b.

In the embodiment, the second and third PTZFI devices 21a and 21b have substantially the same functions and configurations as the first PTZFI device (hereinafter, referred to as 'PTZFI device') 21 and the second and third camera lenses 17a and 17b and, the second and third lenses 18a and 18b have substantially the same functions and configurations as the first camera (hereinafter, also briefly referred to as 'camera') 17 and the first lens (hereinafter, briefly referred to as 'lens') 18 and as a result, will be not described in detail in order to prevent duplication.

That is, the above-mentioned automatic control apparatus 100 of multiple cameras comprises three cameras 17, 17a, and 17b equipped with the lenses 18, 18a, and 18b, respectively and the PTZFI devices 21, 21a, and 21b as camera drivers for the cameras which is main hardware. And the main hardware is connected to software of reference numerals 1 to 8 and three types of distributors 11, 12, and 14. Herein, reference numerals 1 to 8 serve as main parts of an interoperation processor that automatically interoperates a view angle of an auxiliary camera depending on variation of a view angle of a main camera.

Three types of distributors include the synchronizing (sync) signal distributor 11, the timecode distributor 12, and the video select and distributor 14. The sync signal distributor 11 may be configured by one module with the sync signal generator 9 generating a sync signal. In addition, the timecode distributor 12 may be configured by one module with the timecode generator 10 generating a timecode.

The software and three types of distributors as the interoperation processor may be modularized, and thereby disposed in at least one camera.

The cameras 17, 17a, and 17b are extensively connectable and for example, may connect with about 20 cameras for sports broadcasting.

The video select and distributor 14 receives videos of the cameras 17, 17a, and 17b to allow a user to choose necessary videos. That is, the video select and distributor 14 transfer videos which will be actually used to the video monitoring part 13 monitoring normal operations of the cameras or the video capture device 6.

The sync signal distributor 11 distributes the generator lock(genlock) signals generated by the sync signal generator 9 to the cameras 17, 17a, and 17b and the timecode generator 10.

The timecode distributor 12 distributes the timecode generated by the timecode generator 10 to the cameras 17, 17a, and 17b. At this time, the distributed timecodes are first copied by timecode copy part 15, 15a, 15b of each of the PTZFI devices 21, 21a, and 21b and thereafter, transferred to each of the cameras 17, 17a, and 17b and the inside of each of the PTZFI devices 21, 21a, 21b.

Figure 2:
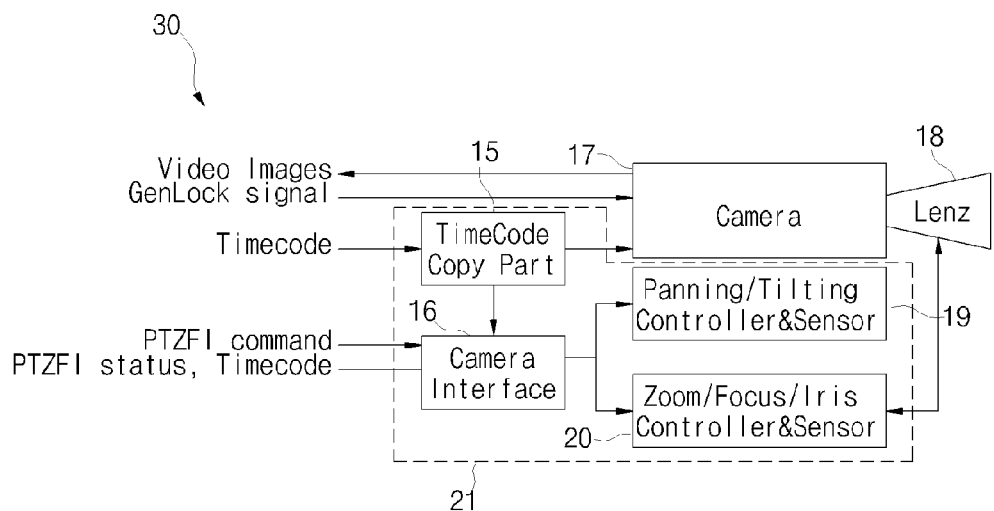
FIG. 2 is a detailed block diagram showing cameras and PTZFI devices of FIG. 1.

FIG. 2 is a detailed block diagram showing cameras and PTZFI devices of FIG. 1.

In the embodiment, for ease of description, the camera 17, the lens 18, and the PTZFI device 21 are called a photographing device 30.

Referring to FIG. 2, the photographing device 30 photographs the video, changes panning P, tilting T, zoom Z, focus F, and iris I, and measures the actual changing values.

The panning/tilting controller and sensor 19 measuring panning and tilting of the camera 17 and changing values thereof provides a mechanical change to the view angle of the camera using a motor, a decelerator, etc. And it 19 grasps whether or not the mechanical change is accurate when the mechanical change is sensed through an incorporated encoder (not shown).

The zoom/focus/iris controller and sensor 20 taking charge of control and sensing of the lens 18 collects a function to be supported by the lens 18 itself. Or it 20 detects values of zoom, focus, and iris themselves or changes thereof through voltage control and measurement with the lens not supporting the control or sensing.

The panning/tilting controller and sensor 19 and the zoom/focus/iris controller and sensor 20 generate and output all information in accordance with the timecode and the genlock signal. That is, the genlock signal is triggered to fit a start and an end of a frame. Therefore, a change of a PTZFI value and an actual measurement value for the change may be transmitted and received through the camera interface 16 in accordance with the genlock signal. In addition, when the information is transmitted from the camera interface 16 to the main interface 7, the photographing device 30 sends the information with the timecode, such that the main interface 7 can ensure the PTZFI value (PTZFI status) related to the video.

Figure 3:
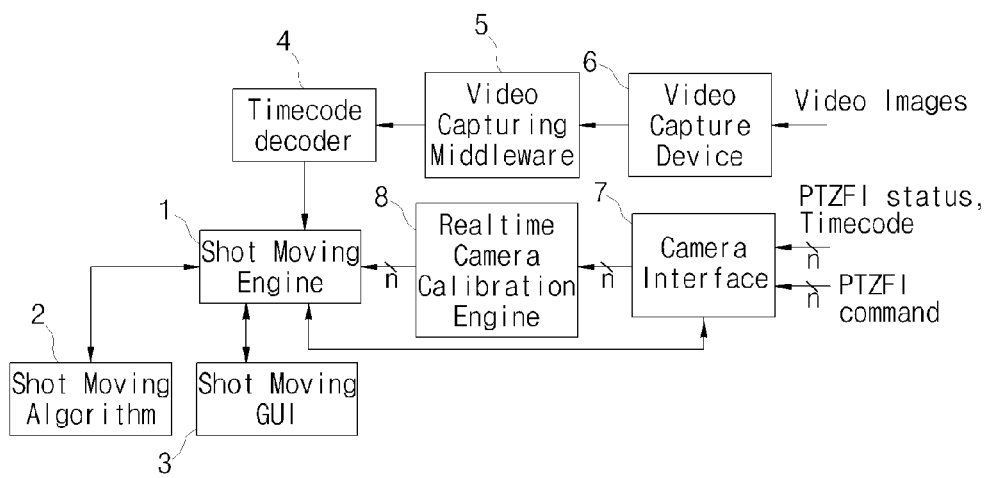
FIG. 3 is a block diagram for a process of providing a shot moving service in an apparatus for automatic control of multiple cameras of FIG. 1.

FIG. 3 is a detailed block diagram of a constituent member for providing a shot moving service in an automatic control apparatus of multiple cameras of FIG. 1.

Referring to FIGS. 1 and 3, the video capture device 6 and the video capturing middleware 5 receive video images inputted through the video select and distributor 14 from the cameras 17, 17a, and 17b and collect the videos in real time. In the embodiment, the video capture device 6 and the video capturing middleware 5 may digitalize and collect high-quality videos of a film recording type or HD (high definition) level or more in real time.

The timecode decoder 4 extracts the timecode from frames captured by the video capture device 6 and the video capturing middleware 5. The timecode is included in a standard video for broadcasting for each frame in accordance with a standard broadcast signal format.

Information-herein, the information includes PTZFI status and timecode—outputted by the PTZFI 21, 21a and 21b connected to the cameras 17, 17a, and 17b includes information on the positions of the cameras and the view angle organized for each timecode. The information is transferred to the main interface 7 from the camera interface 16 in response to a PTZFI command transferred to the camera interface 16 from the main camera 7. The main interface 7 is synchronized with the shot moving engine 1.

The realtime camera calibration engine 8 receives the information through the main interface 7 and calculates the position and view angle of the camera from the received information. Herein, the realtime camera calibration engine 8 grasps receiving sequence of the first, second and third information using the timecode. And the realtime camera calibration engine 8 changes the view angle of the at least one auxiliary camera referring to the receiving sequence and the timecode.

The main interface 7 may be implemented by technical specifications of a parallel digital interface, i.e., RS-422, TIA-422, etc.

The shot moving engine 1 grasps a view angle of a camera providing each video in accordance with the shot moving algorithm 2 through a 3D model. The 3D model expresses a pentahedron of a pyramid type in a sort of 3D space, and has a structure to position the camera at a vertex of a pyramid and position an actual video on a rectangular bottom of the pyramid.

The algorithm for providing the shot moving service and necessary information are processed in the shot moving algorithm 2.

In the embodiment, the shot moving engine 1 is connected to the shot moving GUI 3 which is a graphic user interface for selecting the cameras and providing the shot moving service to the user.

Figure 4:
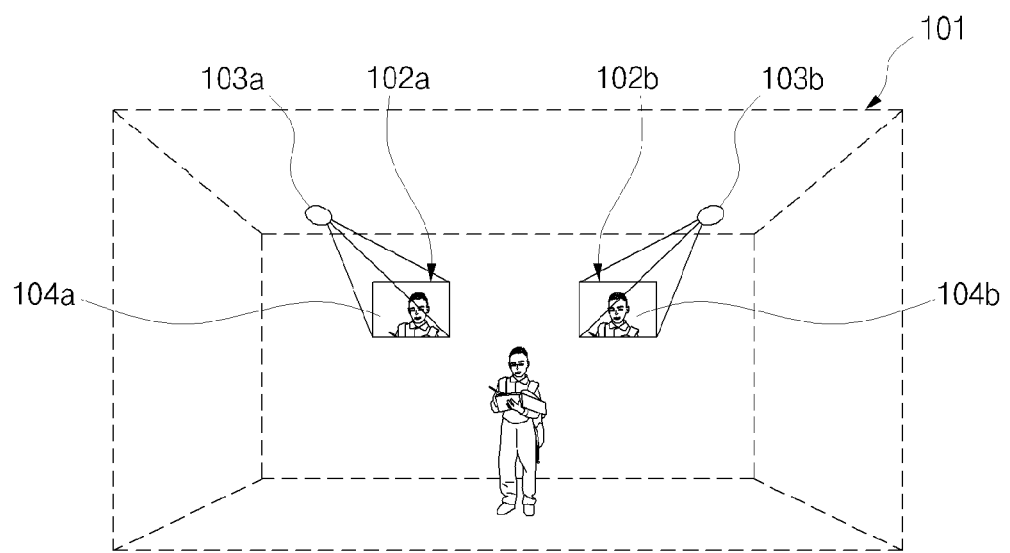
FIG. 4 is a diagram showing a 3D model for describing a view angle of a camera of FIG. 1.
Figure 5:
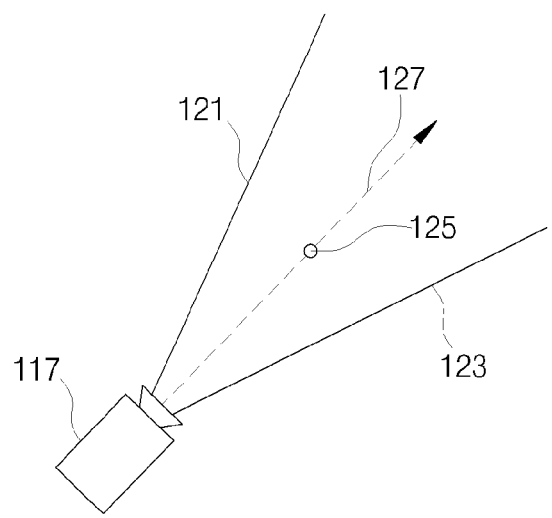
FIG. 5 is a diagram expressing a pyramid model of a main camera of FIG. 4 in a 2 dimension.
Figure 6:
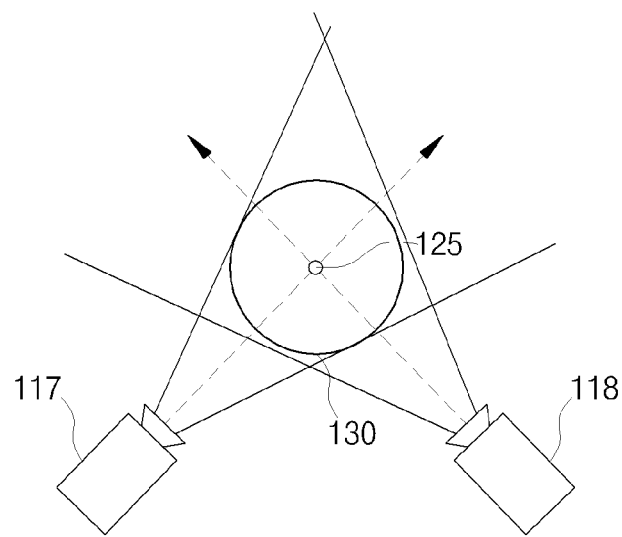
FIGS. 6 to 8 are diagrams for describing a view angle overlapping area of main cameras and a view angle changing reference of an auxiliary camera in an apparatus for automatic control of multiple cameras according to an exemplary embodiment of the present invention.
Figure 7:
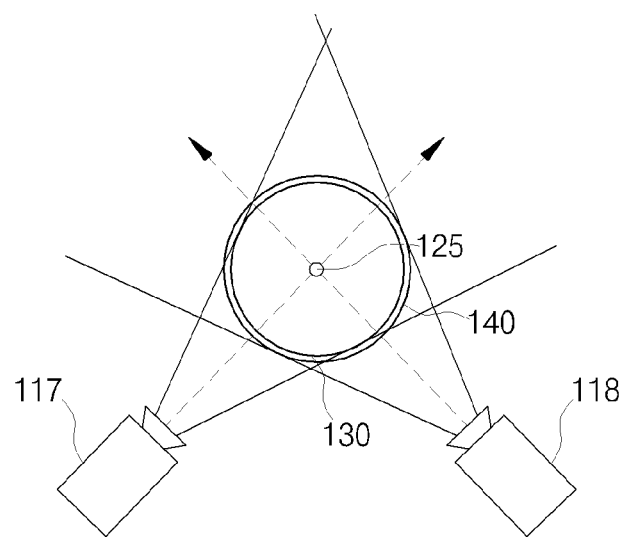
Figure 8:
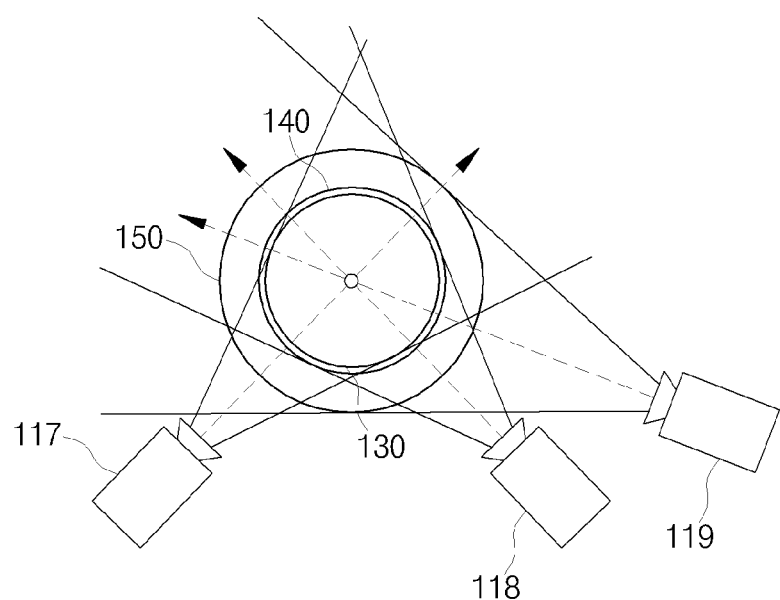

FIG. 4 is a diagram showing a 3D model for describing a view angle of a camera according to an exemplary embodiment of the present invention. FIG. 5 is a diagram expressing a pyramid model of a main camera of FIG. in a 2 dimension. FIGS. 6 to 8 are diagrams for describing view angle references of a main camera and auxiliary cameras according to an exemplary embodiment of the present invention.

As shown in FIG. 4, a 3D world 101 may be expressed by a finite regular hexahedron. And two cameras positioned in the 3D world 101 and the videos photographed by the cameras may be expressed by two pyramid models 102a and 102b. The cameras are positioned at vertexes 103a and 103b of the pyramids in the pyramid models and actually photographed videos are positioned on rectangular bottoms 104a and 104b of the pyramids.

In the shot moving service according to the embodiment, at least one main camera and at least one auxiliary camera are designated as each camera group. When a video producer designates a main interested subject by means of two or more main cameras 103a and 103b in order to capture the most effective shot, the auxiliary camera automatically controls its own view angle with respect to the subject by an operation of the corresponding camera driver.

First, when the pyramid model of the main camera 103a or 103b is, in brief, expressed in a 2 dimension, the pyramid model may be expressed as shown in FIG. 5. In FIG. 5, a first main camera 117 may correspond to any one of two main cameras 103a and 103b.

Referring to FIG. 5, the first main camera 117 is disposed at a location corresponding to the vertex of the pyramid and left and right surfaces of the camera for determining the view angle of the camera may be expressed as two line segments 121 and 123. In addition, when a main interested subject is positioned at a predetermined location 125, a viewing direction 127 of the main camera 117 passes through the center of the bottom of the pyramid model.

Thereafter, as shown in FIG. 6, when the second main camera 118 faces the main interested subject positioned at the predetermined location 125, a sphere 130 is formed in the vicinity of the main interested subject. That is, the sphere 130 is based on the predetermined location 125 in a 3 dimension. In FIG. 6, the sphere (hereinafter, referred to as 'first sphere') 130 is illustrated as a circle in the 2 dimension.

The first sphere 130 becomes a target point for the variation of the view angles of all the main cameras. In addition, the first sphere 130 serves as a variation reference of the view angle of the auxiliary camera 119 (see FIG. 8).

Meanwhile, as shown in FIG. 7, when the second main camera 118 is used in addition to the first main camera 117, two spheres, i.e., the first sphere 130 and a second sphere 140 may be formed in the vicinity of the main interested subject. In FIG. 7, the first and second spheres 130 and 140 are illustrated as two concentric circular shapes. Such two spheres 130 and 140 are acquired because the view angle of the first main camera 117 and the view angle of the second main camera 118 are different from each other. The producer selects and determines any one of the two spheres 130 and 140 formed in the vicinity of one main interested subject as the target point for the variation of the view angle.

Next, as shown in FIG. 8, the panning and tilting of the auxiliary camera 119 are determined by taking the first or second sphere 130 or 140 formed by the first main camera 117 or the second main camera 118 as the target point for the variation of the view angle. And the auxiliary camera 119 is controlled to contact the first sphere or the second sphere by adjusting the view angle, zoom, focus, or a combination thereof.

As described above, according to the embodiment, the view angle of the auxiliary camera is automatically changed depending on the view angle of the main camera, such that it is possible to automatically control angles of the rest cameras depending on an angle of a predetermined camera in a multiple-camera environment. Accordingly, the camera can be automatically managed in real time in the multiple-camera environment and the camera angle regardless of a constraint of the camera location can be supported. Further, it is possible to efficiently support shot moving by interoperating the positions and poses of the other plurality of cameras with a position and a pose of at least one predetermined camera.

According to an exemplary embodiment of the present invention, it is possible to provide hardware of multiple cameras, software, and services thereof. That is, it is possible to provide a method and an apparatus for automatic control of multiple cameras automated in real time in which may be extended to dozens to hundreds apparatus by camera apparatuses modularized and automatic view angle shift can be ensured by cameraman's minimum intervening.

Further, according to the exemplary embodiment of the present invention, videos and positions of cameras, pose information and videos may coincide with each other per frame through timecodes and genlock signals. Therefore, it is possible to reduce human and material costs for photographing in a broadcast or a movie through real-time and management of automated multiple cameras.

In particular, since being ensuring automatic view angle shift by cameraman's minimum intervening and a view angle of 360 degrees or more for a main interested object, and thereby the present invention can be flexibly applied to an environment requiring substantial real-time broadcasting such as various sports broadcasts. Moreover, the present invention has an advantage of providing a new video service.

Further, according to the exemplary embodiment of the present invention, the present invention can be used in additional video processing or 3D restoration using multiple cameras through introduction of a camera view angle model concept.

An exemplary embodiment of the present invention is disclosed through a detailed description and drawings as described above. Herein, specific terms have been used, but are just used for the purpose of describing the present invention and are not used for defining the meaning or limiting the scope of the present invention, which is disclosed in the appended claims. Therefore, it will be appreciated to those skilled in the art that various modifications are made and other equivalent embodiments are available. Accordingly, the actual technical protection scope of the present invention must be determined by the spirit of the appended claims.

What is claimed is:

1. A processor's operating method for automatic control of multiple cameras, comprising:
    receiving first information that is outputted from a first camera driver in accordance with a genlock signal and includes view angle information and a timecode of a first main camera;
    receiving second information that is outputted from a second camera driver in accordance with the genlock signal and includes view angle information and the timecode of a second main camera;
    receiving third information that is outputted from at least one third camera driver in accordance with the genlock signal and includes view angle information of at least one auxiliary camera and the time code;
    changing the view angle of the at least one auxiliary camera to a view angle changing reference formed by a view angle overlapping area of the first and second main cameras on the basis of the view angle information of the first or second main camera within the first information or the second information; and
    calculating positions and the view angles of the first and second main cameras in accordance with the timecode.

2. The method of claim 1, wherein the view angle changing reference includes an imaginary circle or an imaginary sphere that is in inner contact with the view angle overlapping area.

3. The method of claim 1, further comprising:
    distributing a timecode and a generator lock(genlock) signal to the first, second, and third camera drivers;
    and, wherein the first, second, and third camera drivers measure panning and tilting of the first, second, and third camera and variation values thereof respectively, controls and senses lenses of the first, second, and third camera.

4. The method of claim 1, wherein the changing the view angle of the at least one auxiliary camera comprising:
    grasping receiving sequence of the first, second and third information using the timecode; and
    changing the view angle of the at least one auxiliary camera referring to the receiving sequence.

5. The method of claim 1, further comprising: grasping the view angles of the first and second main cameras for the frames of video images using a shot moving engine in accordance with a shot moving algorithm for a multiple-camera interoperation service.

6. The method of claim 5, further comprising:
    capturing and collecting the video images from the first, second, and third information;
    extracting the timecode from the collected video images; and
    transfering the timecode to the shot moving engine.

7. The method of claim 5, further comprising:
    providing a selective input for the first main camera or the second main camera for the multiple-camera interoperation service through a user interface.

8. The method of claim 5, further comprising outputting the video images through a video monitoring part.

9. The method of claim 1, further comprising receiving the information to transfer to a video capture device.

10. The method of claim 1, further comprising outputting a signal for changing the view angle of the at least one auxiliary camera on the basis of selection signals for the first main camera, the second main camera, or the first and second main cameras, which are inputted through a user interface.

* * * * *